(12) United States Patent
Labock

(10) Patent No.: US 7,318,956 B2
(45) Date of Patent: Jan. 15, 2008

(54) ONE WAY BULLET-RESISTANT TRANSPARENT PANEL

(75) Inventor: Yosef Labock, Weston, FL (US)

(73) Assignee: Labock Technologies Inc., Weston, FL (US)

( * ) Notice: Subject to any disclaimer, the term of this patent is extended or adjusted under 35 U.S.C. 154(b) by 0 days.

(21) Appl. No.: 11/047,748

(22) Filed: Feb. 1, 2005

(65) Prior Publication Data

US 2005/0238880 A1    Oct. 27, 2005

Related U.S. Application Data

(63) Continuation-in-part of application No. 10/854,130, filed on May 25, 2004, now abandoned, which is a continuation-in-part of application No. 10/745,196, filed on Dec. 23, 2003, now abandoned.

(51) Int. Cl.
    *B32B 7/02*     (2006.01)
    *B32B 17/06*    (2006.01)
    *B32B 27/32*    (2006.01)

(52) U.S. Cl. ...................... 428/212; 428/220; 428/412; 428/414; 428/415; 428/423.1; 428/426; 52/786.1; 52/786.11

(58) Field of Classification Search ................ 428/212, 428/220, 412, 414, 415, 423.1, 423.7, 426, 428/430; 109/10, 49.5, 80; 52/786.1, 786.11
See application file for complete search history.

(56) References Cited

U.S. PATENT DOCUMENTS

| 4,594,290 A |   | 6/1986 | Fischer et al. |
| 5,506,051 A | * | 4/1996 | Levy-Borochov et al. .. 428/332 |
| 5,747,159 A |   | 5/1998 | Labock |

* cited by examiner

*Primary Examiner*—Milton I. Cano
*Assistant Examiner*—Lawrence D. Ferguson
(74) *Attorney, Agent, or Firm*—Laurence A. Greenberg; Werner H. Stemer; Ralph E. Locher

(57) ABSTRACT

Transparent panels having unidirectional bullet-resisting characteristics contain at least one sheet of glass, several intermediate sheets formed of an acrylic resin or further glass sheets, and an inner sheet formed of a polycarbonate resin. A transparent adhesive bonds the sheets to each other to form the panel. The level of bullet resistance capability is measured according to NIJ standards and the panels have a Level III or Level IV rating.

27 Claims, 4 Drawing Sheets

ONE WAY BULLET-RESISTANT TRANSPARENT PANEL

CROSS-REFERENCE TO RELATED APPLICATIONS

This application is a continuation-in-part of U.S. application Ser. No. 10/854,130 filed May 25, 2004, now abandoned which is a continuation-in-part of U.S. application Ser. No. 10/745,196 filed Dec. 23, 2003, now abandoned. The entire disclosures of these applications are herewith incorporated by reference.

BACKGROUND OF THE INVENTION

Field of the Invention

The invention relates generally to bullet-resistant transparent panels and more specifically to unidirectional bullet-resistant transparent panels meeting National Institute of Justice (NIJ) Standard Level III and to transparent panels that resist armor piercing bullets.

Many prior art panels are formed of front or impact shock receiving layers formed of glass and solid resinous materials such as polycarbonate, acrylic and rubber-modified acrylics, among many other materials. The back layer, facing away from the direction of impact, is generally formed of a polycarbonate.

One type, as described for example in U.S. Pat. No. 4,594,290, to Fischer et al., is formed of transparent sheets of glass or cast acrylic, a polyurethane sheet and a urethane-modified acrylic sheet. However, such protective panels are not unidirectional and these panels prevent bullet penetration from either side.

U.S. Pat. No. 5,747,159 to Labock teaches a panel having unidirectional bullet-resisting properties. The panel is formed of an outer sheet of an acrylic resin and an inner sheet of a polycarbonate resin. In order to meet NIJ Standard Level III, the panel is both thick, 41.6-45.6 mm, and heavy 80-90 Kg per square meter.

SUMMARY OF THE INVENTION

This invention relates to a one way bullet-resistant transparent panel meeting NIJ level III standards and an armor piercing bullet-resistant transparent panel which for products of this type is comparatively light, thin, bullet-resistant, and provides unidirectional characteristics.

It has been surprisingly found, as will be shown more particularly below, that when the glass, acrylic and polycarbonate sheets are of the below described thicknesses, the laminated panel exhibits unidirectional bullet-resisting characteristics. The panels of the present invention are particularly useful in constructing enclosures, such as in/on a vehicle, a protective cage for a teller, or other such protective closures. In addition to the panel protecting against projectiles such as bullets and other shells fired from "outside" at the panel, the panel permits insiders to fire weapons against the attackers through the panel.

With the foregoing and other objects in view there is provided, in accordance with the invention, a panel effective for blocking penetration of a bullet. The panel is formed of an outer sheet formed of glass, an acrylic resin layer having a thickness of about 25 to about 35 mm, an inner sheet formed of a polycarbonate resin, and an adhesive bonding the outer sheet, the acrylic resin layer, and the inner sheet to each other.

Preferably the outer sheet has a thickness of about 4 mm to about 8 mm, and the inner sheet has a thickness of about 4 mm to about 8 mm. In addition, the adhesive has a thickness of about 0.1 mm to about 2 mm.

At least one of the outer sheet and the inner sheet has a scratch-resistant coating formed thereon on a face thereof not coated with the bonding adhesive.

In accordance with a feature of the invention, the outer sheet, the acrylic resin layer, and the inner sheet have a flat or curved configuration. For example, the outer sheet, the acrylic resin layer, and the inner sheet are bonded to each other to have a shape of a windshield.

Ideally, the outer sheet has a thickness of about 6 mm, the acrylic resin layer has a thickness of about 30 mm, the inner sheet has a thickness of about 6 mm, and the bonding adhesive is disposed between the sheets and the layer and has a thickness of about 1.3 mm.

The panel has a first side and a second side, the panel prevents an object from penetrating the first side but allows a bullet to traverse the panel when fired at the second side. More specifically, the panel meets National Institute of Justice Standard Level III for bullet penetration prevention.

With the foregoing and other objects in view there is further provided, in accordance with the invention, a transparent panel effective for blocking the penetration of a bullet. The transparent panel is formed of a first glass sheet, a second glass sheet bonded to the first glass sheet, a first acrylic sheet bonded to the second glass sheet, a second acrylic sheet bonded to the first acrylic sheet, a third acrylic sheet bonded to the second acrylic sheet, a polycarbonate sheet bonded to the third acrylic sheet, a first side, and a second side. The transparent panel meets National Institute of Justice Standard Level IV and prevents a penetration of a bullet through the transparent panel when fired at the first side, but allows a penetration of a further bullet through the transparent panel when fired at the second side.

Preferably, the first glass sheet has a thickness in a range of about 4 mm to about 8 mm, the second glass sheet has a thickness in a range of about 10 mm to about 14 mm, the first, second and third acrylic sheets each have a thickness in a range of about 7 mm to about 12 mm, and the polycarbonate sheet has a thickness in a range of about 4 mm to about 8 mm.

In accordance with a feature of the invention, the first and second glass sheets are annealed glass sheets.

In accordance with a preferred embodiment of the invention, the first glass sheet has a thickness of about 6 mm, the second glass sheet has a thickness of about 12 mm, the first, second and third acrylic sheets each have a thickness of about 9.5 mm, and the polycarbonate sheet has a thickness of about 6 mm.

With the foregoing and other objects in view there is additionally provided, in accordance with the invention, a panel effective for blocking the penetration of a bullet. The panel is formed of a first glass sheet, a second glass sheet bonded to the first glass sheet, an acrylic sheet bonded to the second glass sheet, a polycarbonate sheet bonded to the acrylic sheet, a first side, and a second side. The panel meets National Institute of Justice Standard Level IV and prevents a penetration of the bullet through the panel when fired at the first side, but allows a penetration of a further bullet through the panel when fired at the second side.

In a preferred embodiment of the invention, the first glass sheet has a thickness in a range of about 4 mm to about 8 mm, the second glass sheet has a thickness in a range of about 10 mm to about 14 mm, the acrylic sheet has a thickness in a range of about 25 mm to about 35 mm, and the polycarbonate sheet has a thickness in a range of about 4 mm to about 8 mm.

In accordance with an added feature of the invention, the first glass sheet has a thickness of about 6 mm, the second glass sheet has a thickness of about 12 mm, the acrylic sheet has a thickness of about 30 mm, and the polycarbonate sheet has a thickness of about 6 mm.

With the foregoing and other objects in view there is yet additionally provided, in accordance with the invention, a panel effective for blocking the penetration of a 50 caliber bullet. The panel is formed of a first glass sheet, a second glass sheet bonded to the first glass sheet, a third glass sheet bonded to the second glass sheet, a fourth glass sheet bonded to the third glass sheet, a fifth glass sheet bonded to the fourth glass sheet, and a polycarbonate sheet bonded to the fifth glass sheet.

In accordance with another feature of the invention, the first glass sheet has a thickness of about 4 mm to about 8 mm, the second glass sheet has a thickness of about 15 mm to about 24 mm, the third glass sheet has a thickness of about 15 mm to about 24 mm, the fourth glass sheet has a thickness of about 15 mm to about 24 mm, the fifth glass sheet has a thickness of about 8 mm to about 15 mm, and the polycarbonate sheet has a thickness of about 4 mm to about 8 mm.

In accordance with another feature of the invention, the adhesive is a polyvinyl butural copolymer, urethane, or a polyester copolymer for bonding the sheets to each other.

In accordance with a concomitant feature of the invention, the first glass sheet has a thickness of about 6 mm, the second glass sheet has a thickness of about 19.5 mm, the third glass sheet has a thickness of about 19.5 mm, the fourth glass sheet has a thickness of about 19.5 mm, the fifth glass sheet has a thickness of about 12.5 mm, and the polycarbonate sheet has a thickness of about 6 mm.

Other features which are considered as characteristic for the invention are set forth in the appended claims.

Although the invention is illustrated and described herein as embodied in a one way bullet-resistant transparent panel meeting NIJ level III standards and an armor piercing bullet-resistant transparent panel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
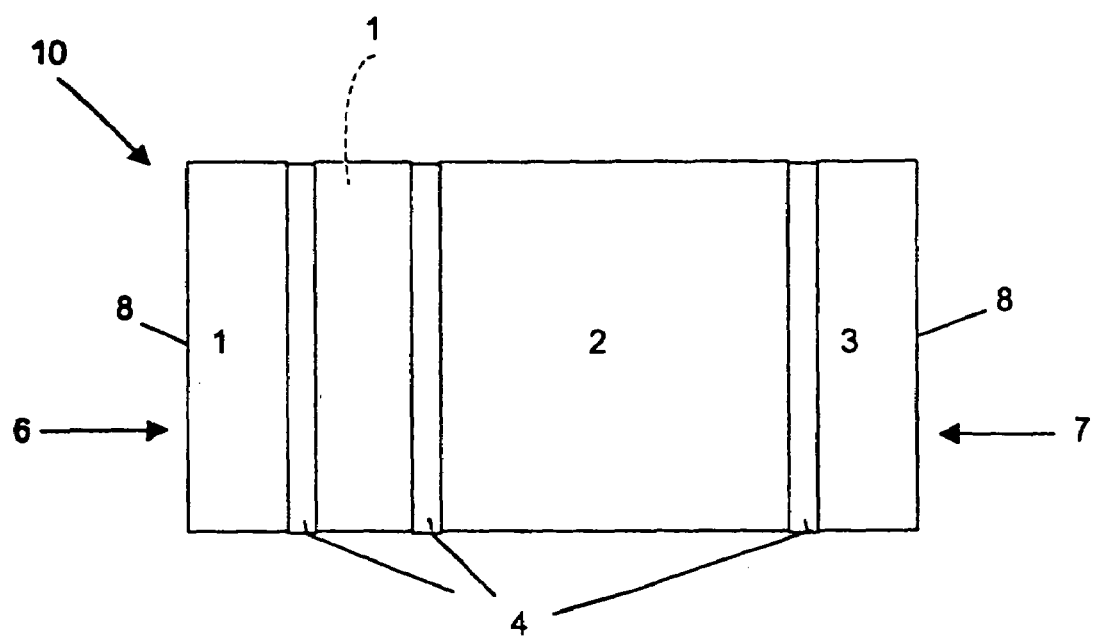
FIG. 1 is a diagrammatic, sectional view of a first embodiment of a bullet-resistant panel according to the invention.

Referring now to the figures of the drawings in detail and first, particularly to FIG. 1, thereof, there is shown a first embodiment of a bullet-resistant panel 10. The bullet-resistant panel 10 is formed of an outer transparent sheet 1 of glass, a layer of an acrylic resin sheet 2, and an inner transparent sheet 3 of a polycarbonate resin. A transparent polyurethane or urethane adhesive 4 is disposed between the sheets 1-3 bonding them together to form the integral panel 10.

The acrylic resin sheet 2 has a high degree of hardness, but is somewhat brittle. On the other hand, the polycarbonate resin sheet 3 is less hard than the acrylic resin sheet 2, but is elastic or less brittle. By using the combination of the three types of sheets 1, 2, 3 to form the panel 10, the outer glass sheet 1 and the acrylic resin sheet 2 impart a high degree of hardness to an outer face of the panel 10 receiving an impact, such as by a projectile, for example a shell, shell fragments, a bullet, a stone, a rock or the like, and attenuates the force of the impact. The polycarbonate resin sheet 3 on the inner face of the panel 10 absorbs the attenuated force and supports the acrylic resin sheet 2 against breaking or shattering. The combination of the three sheets 1, 2, 3 thus provide a high degree of resistance against penetration or shattering by a projectile.

Surprisingly, it has been found that the panel 10 illustrated in FIG. 1 has unidirectional bullet-resisting characteristics if the sheets 1-3 are made of predetermined thicknesses. Most preferably, the outer transparent sheet 1 of glass has a thickness of about 4 mm to about 8 mm, preferably about 6 mm, the acrylic resin sheet 2 has a thickness about 25 to about 35 mm, and the inner transparent sheet 3 of polycarbonate resin has a thickness of about 4 mm to about 8 mm, preferably about 6 mm. The sheets 1, 2, 3 are bonded together by the transparent polyurethane or urethane adhesive 4. Such a panel has been found to block the penetration of a 7.62×39 mm, 7.62×51 mm, and 5.51×45 mm bullets when fired from a first side 6 of the outer glass sheet 1, but not when fired from a second side 7 of the inner polycarbonate resin sheet 3. In other words, from the second or inner side 7 one can shoot a bullet through the panel from the inner side and the panel 10 will at least partially self-seal itself after the bullet has passed through the panel 10.

The outer transparent sheet 1 is formed of standard glass. The polycarbonate sheet 3 is manufactured by GE. The acrylic resin sheet 2 is a cast acrylic sheet also manufactured by GE.

The adhesive 4 is a clear liquid polyurethane or urethane adhesive commonly available for bonding polycarbonate to itself, glass or metal. In general the adhesive has an elongation of about 300%, and is preferably applied at a thickness of about 0.1 to about 2 mm, and most preferably is applied at a thickness of about 1.3 mm.

Significant results are obtained when the panel 10 is formed as now described. The outer transparent sheet 1 of glass is about 5.5 mm or 6 mm, the acrylic resin sheet 2 is about 30 mm, the inner transparent sheet 3 formed of polycarbonate has a thick of about 5.5 mm or 6 mm, and the transparent polyurethane adhesive 4 has a thickness of about 1.3 mm.

The outer transparent sheet 1 and/or the inner transparent sheet 3 optionally has a scratch-resistant coating 8 formed thereon on a face thereof not containing the transparent adhesive 4.

The panel 10 has a layered type of construction. Each layer has uniform mechanical properties that are insulated by the bonding agent 4 and the selection and thickness of the bonding agent can have a significant impact on the worthiness of the panel 10. Due to the layered construction, an incoming projectile requires more energy to penetrate the multiple layers when properly bonded.

Optionally, the transparent panel 10 shown in FIG. 1 can be modified by adding a second glass layer 1 having a thickness of about 4 mm to about 8 mm and has good properties at about 5.5 mm or 6 mm. The second glass layer 1 is shown by a dashed indicator line in FIG. 1. The second glass layer 1 provides extra hardness that adds to the bullet stopping power of the transparent panel 10.

FIG. 1 illustrates the transparent panel 10 having a flat configuration, such as may be used for side windows on a vehicle, building windows, windows for protective cages and the like. It will be appreciated that the panel can be shaped, angled, curved and/or bent and is not restricted to the flat configuration shown and can be used for other configurations such as windshields, curved glass panels and the like.

Figure 2:
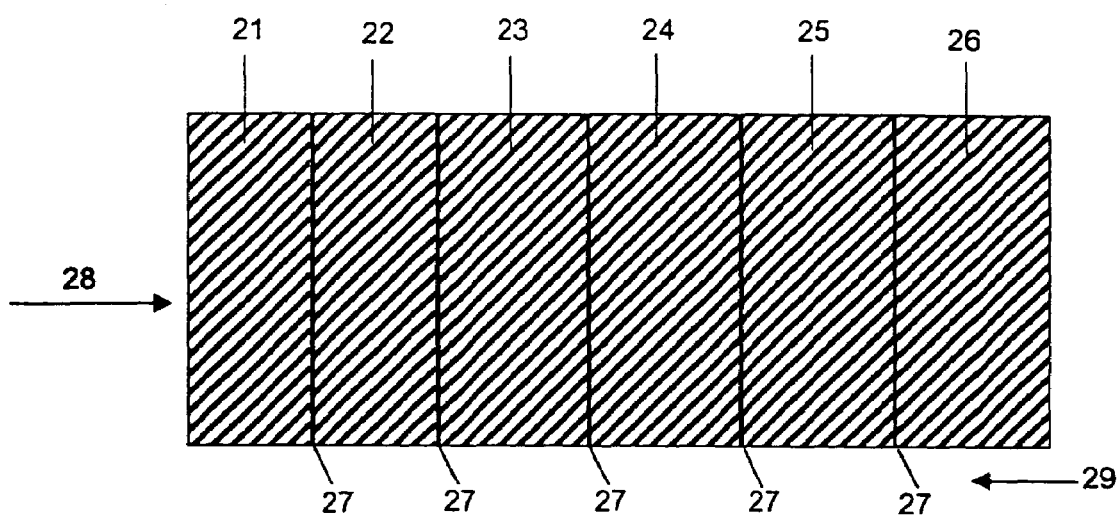
FIG. 2 is a diagrammatic, sectional view of a second embodiment of the bullet-resistant panel according to the invention.

FIG. 2 is a second embodiment of a transparent panel 20 according to the invention. The second embodiment is an NIJ Level IV panel (armor piercing) panel that also has the one-way properties as in the first embodiment. On the return side or shooting out, NIJ Level III non-armor piercing ammo can be used. More specifically, the second embodiment will also stop armor piercing bullets from penetrating from a first direction 28 but will allow bullets (e.g. non-armor piercing) to penetrate from a second or other direction 29 as in the first embodiment. The bullets penetrating from the permeable side will retain approximately 75% of their velocity upon exiting the panel 20.

The panel 20 is bonded together to maintain the properties of a one-piece assembly. The individual mechanical characteristics of the materials used in each layer act independently and are not affected by the mechanical characteristics of the other layers or by the applied bonding agent such as bonding with urethane based adhesives or glues.

FIG. 2 shows the panel 20 formed of a first glass layer 21 having a thickness of about 4-8 mm, preferably about 6 mm, a second glass layer 22 having a thickness of about 10-14 mm, preferably about 12 mm, a first acrylic layer 23 having a thickness of about 7-12 mm, preferably about 9.5 mm, a second acrylic layer 24 having a thickness of about 7-12 mm, preferably about 9.5 mm, a third acrylic layer 25 having a thickness of about 7-12 mm, preferably about 9.5 mm, and a polycarbonate layer 26 having a thickness of about 4-8 mm, preferably about 6 mm. The layers 21-26 are bonded together using an adhesive 27 such as urethane or polyurethane.

The glass layers 21, 22 may be standard glass or annealed glass which is glass that has been softened usually by a thermal process. More specifically, annealed glass is not as rigid and brittle as standard glass.

The second embodiment enjoys several advantages over prior art panels. First, the panel 20 has a high bullet blocking capability and can block armor piercing ammo. Second, there is no distortion of objects or images seen through the panel 20. Third, a high level of clarity is achieved and thus the panel 20 is idea for use as windshields. Fourth, the panel 20 provides unidirectional bullet blocking behavior and unidirectional bullet permeable behavior.

Figure 3:
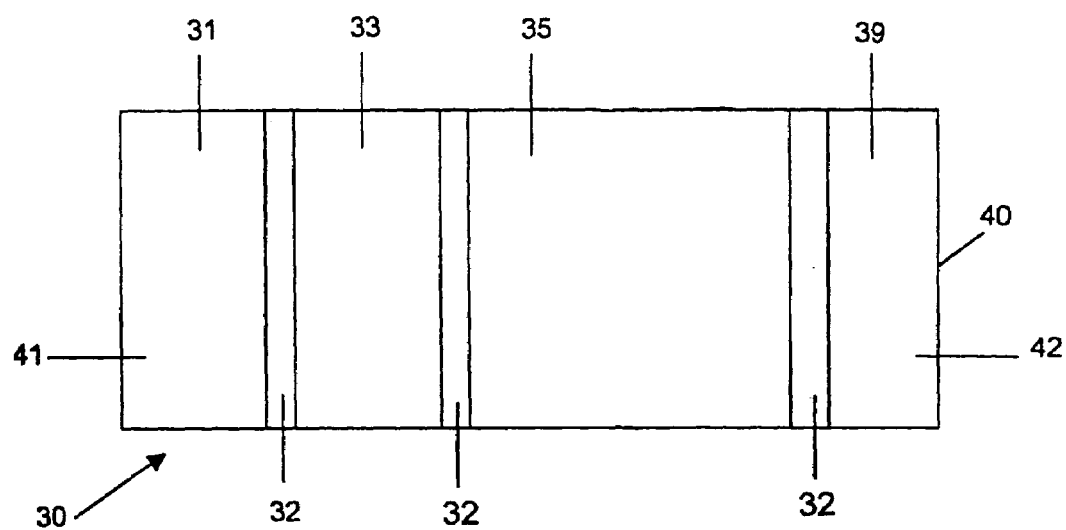
FIG. 3 is a diagrammatic, sectional view of a third embodiment of the bullet-resistant panel according to the invention.

FIG. 3 shows a third embodiment of a bullet-resistant panel 30. The third embodiment is also an NIJ Level IV panel (armor piercing) panel that also has the one-way properties as in the first embodiment. On the return side or shooting out side, NIJ Level III non-armor piercing ammo can be used. More specifically, the third embodiment will also stop bullets from penetrating from a first direction 41 but will allow bullets to penetrate from a second or other direction 42 as in the first and second embodiments. The bullets penetrating from the permeable side will retain approximately 75% of their velocity upon exiting the panel 30.

As with the first and second embodiments, the third embodiment can be installed on vehicles, buildings, guard towers, windshields and any other installations that require a high level of light transparency and minimum distortion and at the same time the ability to withstand armor piercing shells and bullets.

The panel 30 is formed of a first sheet 31 of glass and has a range of about 4 to about 8 mm, ideally about 6 mm. A second sheet 33 of glass is bonded to the first sheet 31. A bonding agent 32 that is clear and has the desired light transparency properties is used. The second sheet 33 has a thickness in a range of about 10 to about 14 mm, ideally about 12 mm. A third sheet 35 of an acrylic layer is bonded to the second sheet 33 using the adhesive 32. The third sheet 35 has a thickness in a range of about 25 to about 35 mm, ideally about 30 mm. A fourth sheet 39 of a polycarbonate layer is bonded to the third sheet 35. The fourth sheet 39 has a thickness in a range of about 4 to about 8 mm, ideally about 6 mm. A scratch resistance layer 40 is optionally applied onto the polycarbonate sheet 39.

The bonding agent 32 is preferably polyester or PVB. PVB or polyvinyl butural is a synthetic material in the form of a film and is commercially available in different thicknesses. The bonding agent 32 has a thickness of about 0.03 mm. Alternatively, a urethane or polyurethane having a thickness of 0.06-2 mm could be used. Of course the bonding agent 32 is merely exemplary as many types of adequate bonding agents are available.

The transparent panel 30 will generally be capable of resisting penetration against 7.62×39 caliber (Kalachnikov AK-47) armor piercing and 5.56 (M–16) armor piercing bullets. The panel 30 meets the NIJ Level IV standard for armor piercing bullets.

It is further noted that as in the first and second embodiments of the present invention the third panel 30 is also unidirectional. The panel 30 will block the penetration of a bullet when fired from side 41 of the outer glass sheet 31, but not when fired from side 42 of the inner polycarbonate sheet 39.

Figure 4:
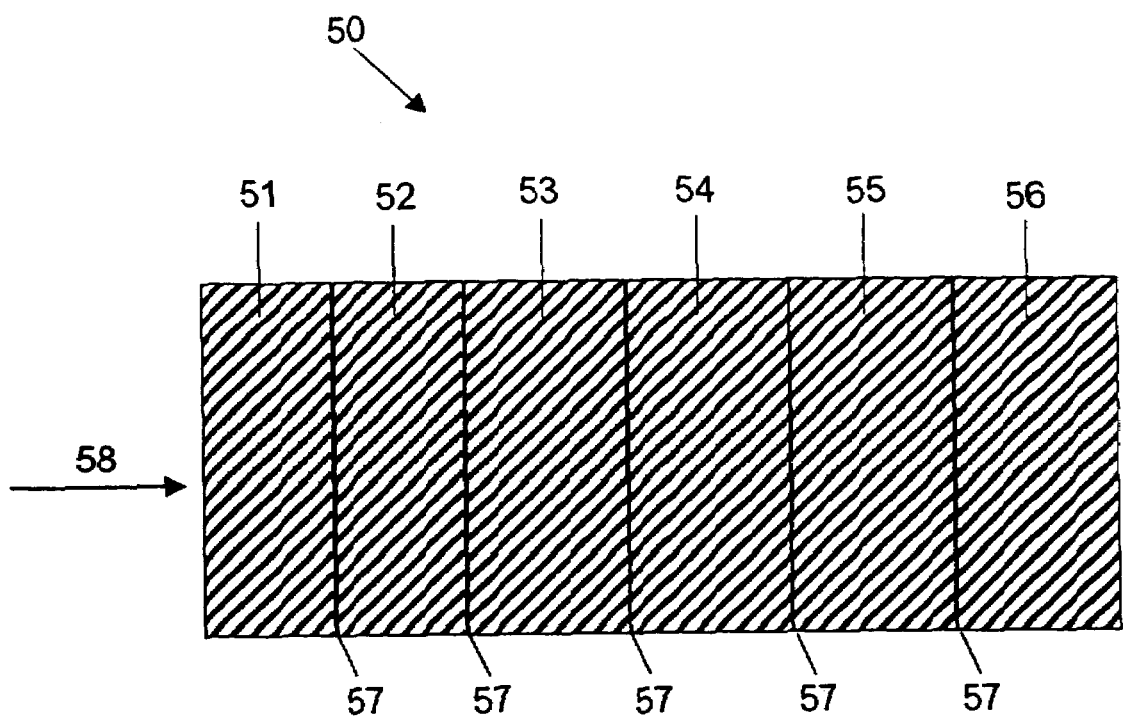
FIG. 4 is a diagrammatic, sectional view of a fourth embodiment of the bullet-resistant panel according to the invention.

FIG. 4 shows a fourth embodiment of a bullet-resistant panel 50. The unique feature of the panel 50 is that it will stop a 50 caliber bullet. However, the panel 50 is not unidirectional. The panel 50 is formed of a first glass layer 51 having a thickness of about 4 to about 8 mm, preferably about 6 mm. A second glass layer 52 is adjacent the first glass layer 51 and has a thickness of about 15 to about 24 mm, preferably about 19.5 mm. A third glass layer 53 is adjacent the second glass layer 52 and has a thickness of about 15 to about 24 mm, preferably about 19.5 mm. A fourth glass layer 54 is adjacent the third glass layer 53 and has a thickness of about 15 to about 24 mm, preferably about 19.5 mm. A fifth glass layer 55 is adjacent the fourth glass layer 51 and has a thickness of about 8 to about 15 mm, preferably about 11.5 mm. A sixth polycarbonate layer 56 is adjacent the fifth glass layer 55 and has a thickness of about 4 to about 8 mm, preferably about 6 mm.

A bonding agent 57 preferably polyester, PVB, or urethane is used to bond the first through sixth panels 51-56 to each other.

As noted above, the panel 50 will stop a 50 caliber projectile shot when shot at a first side 58.

I claim:

1. A transparent panel effective for blocking penetration of a bullet, the transparent panel comprising:

a first glass sheet;

a second glass sheet bonded to said first glass sheet;

a first acrylic sheet bonded to said second glass sheet;

a second acrylic sheet bonded to said first acrylic sheet;

a third acrylic sheet bonded to said second acrylic sheet, said first, second and third acrylic sheets each have a thickness in a range of about 7 mm to about 12 mm;

a polycarbonate sheet bonded to said third acrylic sheet;

a first side; and a second side, the transparent panel meeting National Institute of Justice Standard Level IV and preventing a penetration of the bullet through the transparent panel when fired at said first side, but allowing a penetration of a further bullet through the transparent panel when fired at said second side.

2. The transparent panel according to claim 1, wherein
said first glass sheet has a thickness in a range of about 4 mm to about 8 mm;

said second glass sheet has a thickness in a range of about 10 mm to about 14 mm; and said polycarbonate sheet has a thickness in a range of about 4 mm to about 8 mm.

3. The transparent panel according to claim 1, wherein said first and second glass sheets are annealed glass sheets.

4. The transparent panel according to claim 1, wherein said sheets are bonded to each other with an adhesive.

5. The transparent panel according to claim 4, wherein said adhesive is an urethane glue.

6. The transparent panel according to claim 1, wherein said first glass sheet, said second glass sheet, said first acrylic sheet, said second acrylic sheet, said third acrylic sheet, and said polycarbonate sheet bonded to each other have a shape of a windshield.

7. The transparent panel according to claim 1, wherein said first glass sheet, said second glass sheet, said first acrylic sheet, said second acrylic sheet, said third acrylic sheet, and said polycarbonate sheet bonded to each other have a curved shape.

8. The transparent panel according to claim 1, wherein
said first glass sheet has a thickness of about 6 mm;

said second glass sheet has a thickness of about 12 mm;

said first, second and third acrylic gheets each have a thickness of about 9.5 mm; and said polycarbonate sheet has a thickness of about 6 mm.

9. The transparent panel according to claim 1, wherein the transparent panel prevents the penetration of an armor piercing bullet fired at said first side.

10. A panel effective for blocking penetration of a 50 caliber bullet, the panel comprising:

a first glass sheet;

a second glass sheet bonded to said first glass sheet, said second glass sheet having a thickness of about 15 mm to about 24 mm;

a third glass sheet bonded to said second glass sheet, said third glass sheet having a thickness of about 15 mm to about 24 mm;

a fourth glass sheet bonded to said third glass sheet;

a fifth glass sheet bonded to said fourth glass sheet;

a polycarbonate sheet bonded to said fifth glass sheet.

11. The panel according to claim 10, wherein said first to fifth glass sheets are annealed glass sheets.

12. The panel according to claim 10, wherein all of said sheets are bonded to each other with an adhesive.

13. The panel according to claim 12, wherein said adhesive is selected from the group consisting of polyvinyl butural copolymers, urethane, and polyester copolymers for bonding said sheets to each other.

14. The panel according to claim 10, wherein the panel is a transparent panel that does not distort images.

15. The panel according to claim 10, wherein said first-fifth glass sheets and said polycarbonate sheet have a shape of a windshield.

16. The panel according to claim 10, wherein said first-fifth glass sheets and said polycarbonate sheet have a curved shape.

17. The panel according to claim 10, wherein said first glass sheet has a thickness of about 4 mm to about 8 mm.

18. The panel according to claim 10, wherein said fourth glass sheet has a thickness of about 15 mm to about 24 mm.

19. The panel according to claim 18, wherein said fifth glass sheet has a thickness of about 8 mm to about 15 mm.

20. The panel according to claim 19, wherein said polycarbonate sheet has a thickness of about 4 mm to about 8 mm.

21. The panel according to claim 10, further including a scratch resistant layer applied to said first and fifth sheet layers.

22. The panel according to claim 10, wherein said first glass sheet has a thickness of about 6 mm.

23. The panel according to claim 22, wherein said second glass sheet has a thickness of about 19.5 mm.

24. The panel according to claim 23, wherein said third glass sheet has a thickness of about 19.5 mm.

25. The panel according to claim 24, wherein said fourth glass sheet has a thickness of about 19.5 mm.

26. The panel according to claim 25, wherein said fifth glass sheet has a thickness of about 12.5 mm.

27. The panel according to claim 26, wherein said polycarbonate sheet has a thickness of about 6 mm.

* * * * *